United States Patent
Treichler et al.

(10) Patent No.: US 7,379,781 B2
(45) Date of Patent: May 27, 2008

(54) CONSTRAINT BASED ORDER OPTIMIZATION SYSTEM AND AVAILABLE TO PROMISE SYSTEM

(75) Inventors: Robert Benjamin Treichler, Fremont, CA (US); Pan Ying Winnie Yuk, Santa Clara, CA (US); Robert Baruch Bresticker, Elburn, IL (US)

(73) Assignee: Logitech Europe S.A., Romanel-sur-Morges (CH)

( * ) Notice: Subject to any disclaimer, the term of this patent is extended or adjusted under 35 U.S.C. 154(b) by 80 days.

(21) Appl. No.: 11/216,873

(22) Filed: Aug. 30, 2005

(65) Prior Publication Data

US 2007/0050069 A1    Mar. 1, 2007

(51) Int. Cl.
*G06F 19/00*    (2006.01)
*G06F 17/30*    (2006.01)
(52) U.S. Cl. ............................. 700/99; 700/101; 705/8; 705/10; 705/28
(58) Field of Classification Search .................. 700/99, 700/101; 705/22–29, 8–10
See application file for complete search history.

(56) References Cited

U.S. PATENT DOCUMENTS

| | | | |
|---|---|---|---|
| 4,459,663 A | 7/1984 | Dye | |
| 5,216,593 A | 6/1993 | Dietrich et al. | |
| 5,315,521 A | 5/1994 | Hanson et al. | |
| 5,615,109 A | 3/1997 | Eder | |
| 5,943,484 A | 8/1999 | Milne et al. | |
| 5,950,170 A | 9/1999 | Pan et al. | |
| 6,167,380 A * | 12/2000 | Kennedy et al. | 705/10 |
| 6,415,195 B1 | 7/2002 | Gleditsch et al. | |
| 6,466,646 B1 | 10/2002 | Dellacherie et al. | |
| 6,567,824 B2 | 5/2003 | Fox | |
| 6,671,673 B1 | 12/2003 | Baseman et al. | |
| 6,701,201 B2 | 3/2004 | Hegde et al. | |
| 6,731,999 B1 | 5/2004 | Yang et al. | |
| 6,873,969 B2 | 3/2005 | Stone et al. | |
| 6,882,982 B2 | 4/2005 | McMenimen et al. | |
| 6,931,090 B2 | 8/2005 | Chao et al. | |
| 6,983,190 B2 | 1/2006 | Denton et al. | |
| 7,103,436 B2 | 9/2006 | Denton et al. | |
| 2002/0035525 A1 * | 3/2002 | Yokota et al. | 705/29 |
| 2003/0105684 A1 * | 6/2003 | Dunn et al. | 705/28 |
| 2003/0144896 A1 * | 7/2003 | Ko et al. | 705/10 |
| 2003/0204454 A1 * | 10/2003 | Lai | 705/28 |
| 2003/0233294 A1 * | 12/2003 | Luo et al. | 705/28 |
| 2004/0117266 A1 * | 6/2004 | Yen et al. | 705/26 |
| 2004/0210489 A1 | 10/2004 | Jackson et al. | |
| 2004/0210621 A1 | 10/2004 | Antonellis | |
| 2004/0254825 A1 * | 12/2004 | Hsu et al. | 705/8 |
| 2005/0171825 A1 * | 8/2005 | Denton et al. | 705/8 |
| 2005/0171828 A1 * | 8/2005 | Denton et al. | 705/8 |
| 2006/0004620 A1 * | 1/2006 | Lee et al. | 705/10 |
| 2006/0085294 A1 * | 4/2006 | Boerner et al. | 705/28 |

* cited by examiner

*Primary Examiner*—Leo Picard
*Assistant Examiner*—Sheela Rao
(74) *Attorney, Agent, or Firm*—Townsend and Townsend and Crew, LLP

(57) ABSTRACT

A computer system which uses customer-based business rules that are customized for each customer. These business rules, along with order information, are provided to a linear programming engine. The linear programming engine determines the priority of customer orders based on the business rules and allocates scarce inventory accordingly. In one embodiment, linear programming assigns weights to different factors. Examples of such factors are (1) a promotion activity, (2) a customer priority, (3) the age and delinquency of an order or line item, and (4) the price of the product.

26 Claims, 9 Drawing Sheets

Weighted Delinquencies = Unit Price * Cumulative Units Delinquent * [Customer Priority Weighting + A(Current Number of Days before or after Due Date) + B(Age of Order)]

ATP Scenarios

| | | | | | Results of Rule Calculations | | | Calculated ATP |
|---|---|---|---|---|---|---|---|---|
| | | Booked Backlog | Projected | Desired Results of ATP | rule1 | rule2 | rule3 & lesser of rule 1 & rule 2 | |
| a | Total inventory 100 | | | | | | | |
| | Customer A | 100 | 300 | 0 All Inventory for Customer A Booked Backlog | 0 | 300 | | 0 |
| | Customer B | 200 | 400 | | -500 | 400 | | 0 |
| | Customer C | 200 | | | -1100 | 0 | | 0 |
| b | Total inventory 200 | | | | | | | |
| | | Booked Backlog | Projected | Desired Results of ATP | | | | |
| | Customer A | 100 | 300 | 100 All Inventory for Customer A Booked Backlog and Customer A Projected | 100 | 300 | | 100 |
| | Customer B | 200 | 400 | | -400 | 400 | | 0 |
| | Customer C | 200 | | | -1000 | 0 | | 0 |
| c | Total inventory 300 | | | | | | | |
| | | Booked Backlog | Projected | Desired Results of ATP | | | | |
| | Customer A | 100 | 300 | 200 All Inventory Customer A Booked Backlog and Customer A projected, Customer A sees what is Projected | 200 | 300 | | 200 |
| | Customer B | 200 | 400 | | -300 | 400 | | 0 |
| | Customer C | 200 | | | -900 | 0 | | 0 |
| d | Total inventory 400 | | | | | | | |
| | | Booked Backlog | Projected | Desired Results of ATP | | | | |
| | Customer A | 100 | 300 | 300 Customer A supported | 300 | 300 | | 300 |
| | Customer B | 200 | 400 | | -200 | 400 | | 0 |
| | Customer C | 200 | | | -800 | 0 | | 0 |

*FIG. 5A*

ATP Scenarios (continued)

| | | Booked Backlog | Projected | Desired Results of ATP | Results of Rule Calculations | | | Calculated ATP |
|---|---|---|---|---|---|---|---|---|
| | | | | | rule1 | rule2 | rule3 & lesser of rule 1 & rule 2 |  |
| e | Total inventory 500 | | | | | | | |
| | | | | Customer A Booked Backlog and Projected are met, 100 of Customer B Booked Backlog | | | | |
| | Customer A | 100 | 300 | 300 | 400 | 300 | | 300 |
| | Customer B | 200 | 400 | | -100 | 400 | | 0 |
| | Customer C | 200 | | | -700 | 0 | | 0 |
| f | Total inventory 600 | | | | | | | |
| | | | | Customer A Booked Backlog and Projected are met, Customer B Booked Backlog is met. | | | | |
| | Customer A | 100 | 300 | 300 | 500 | 300 | | 300 |
| | Customer B | 200 | 400 | | 0 | 400 | | 0 |
| | Customer C | 200 | | | -600 | 0 | | 0 |
| g | Total inventory 700 | | | | | | | |
| | | | | Customer A Booked Backlog and Projected are met, Customer B Booked Backlog is met, 100 of Customer B projected | | | | |
| | Customer A | 100 | 300 | 300 | 600 | 300 | | 300 |
| | Customer B | 200 | 400 | 100 | 100 | 400 | | 100 |
| | Customer C | 200 | | | -500 | 0 | | 0 |
| h | Total inventory 800 | | | | | | | |
| | | | | Customer A Booked Backlog and Projected are met, Customer B Booked Backlog is met, 200 of Customer B projected | | | | |
| | Customer A | 100 | 300 | 300 | 700 | 300 | | 300 |
| | Customer B | 200 | 400 | 200 | 200 | 400 | | 200 |
| | Customer C | 200 | | | -400 | 0 | | 0 |

*FIG. 5B*

ATP Scenarios (continued)

| | | | | | | Results of Rule Calculations | | | Calculated ATP |
|---|---|---|---|---|---|---|---|---|---|
| | | | Booked Backlog | Projected | Desired Results of ATP | rule1 | rule2 | rule3 & lesser of rule 1 & rule 2 | | i  Total inventory 900

| | Booked Backlog | Projected | Desired Results of ATP | rule1 | rule2 | Calculated ATP |
|---|---|---|---|---|---|---|
| | | | Customer A Booked Backlog and Projected are met, Customer B Booked Backlog is met, 300 of | | | |
| Customer A | 100 | 300 | 300 | 800 | 300 | 300 |
| Customer B | 200 | 400 | 300 | 300 | 400 | 300 |
| Customer C | 200 | | | -300 | 0 | 0 | j  Total inventory 1000

| | Booked Backlog | Projected | Desired Results of ATP | rule1 | rule2 | Calculated ATP |
|---|---|---|---|---|---|---|
| | | | Customer A and Customer B Booked Backlog and Projected are met | | | |
| Customer A | 100 | 300 | 300 | 900 | 300 | 300 |
| Customer B | 200 | 400 | 400 | 400 | 400 | 400 |
| Customer C | 200 | | | -200 | 0 | 0 | k  Total inventory 1100

| | Booked Backlog | Projected | Desired Results of ATP | rule1 | rule2 | Calculated ATP |
|---|---|---|---|---|---|---|
| | | | Customer A and Customer B Booked Backlog and Projected are met, remaining 100 units fulfill Customer C Booked Backlog | | | |
| Customer A | 100 | 300 | 300 | 1000 | 300 | 300 |
| Customer B | 200 | 400 | 400 | 500 | 400 | 400 |
| Customer C | 200 | | | -100 | 0 | 0 | l  Total inventory 1200

| | Booked Backlog | Projected | Desired Results of ATP | rule1 | rule2 | Calculated ATP |
|---|---|---|---|---|---|---|
| | | | All Booked Backlog and Projected are fulfilled, tier 1 + 2 see what is projected | | | |
| Customer A | 100 | 300 | 300 | 1100 | 300 | 300 |
| Customer B | 200 | 400 | 400 | 600 | 400 | 400 |
| Customer C | 200 | | | 0 | 0 | 0 |

*FIG. 5C*

ATP Scenarios (continued)

| | | Booked Backlog | Projected | Desired Results of ATP | | Results of Rule Calculations | | | Calculated ATP |
|---|---|---|---|---|---|---|---|---|---|
| | | | | | | rule1 | rule2 | rule3 & lesser of rule 1 & rule 2 | |
| m | Total inventory 1300 | | | | All Booked Backlog and Projected are fulfilled, each channel sees 100 upside to projected | | | | |
| | Customer A | 100 | 300 | 400 | | 1200 | 400 | | 400 |
| | Customer B | 200 | 400 | 500 | | 700 | 500 | | 500 |
| | Customer C | 200 | | 100 | | 100 | 100 | | 100 |
| n | Total inventory 1400 | | | | All Booked Backlog and Projected are fulfilled, each channel sees 200 upside | | | | |
| | Customer A | 100 | 300 | 500 | | 1300 | 500 | | 500 |
| | Customer B | 200 | 400 | 600 | | 800 | 600 | | 600 |
| | Customer C | 200 | | 200 | | 200 | 200 | | 200 |

*FIG. 5D*

| | A | B | C | D | E | F | G | H | I | J | K | L | M |
|---|---|---|---|---|---|---|---|---|---|---|---|---|---|
| 1 | Inventory as of COB: | 1/24/05 | | Pick Customer for whom to calc ATP: | | Customer 8 | 3 | Reserved | | | | 3=Customer |
| 2 | MRD as of Weekend of: | 11/27/04 | | | | Customer 9 | | On these Ship Dates (Allocation Date for Customer Collect) | | | | | |
| | | | | Run ATP | | Customer 10 | | | | | | | |
| | | | | | | Customer 11 | | | | | | | |
| | | | | | | Customer 12 | | | | | | | |
| 3 | Priority Used | SKU | 1/24/2005 | 1/25/2005 | 1/26/2005 | 1/27/2005 | 1/28/2005 | 1/31/2005 | 2/1/2005 | 2/2/2005 | 2/3/2005 | 2/4/2005 | 2/7/2005 |
| 159 | 3 | 953636-0000 | | | | | | | | | | | |
| 160 | 3 | 953636-1000 | | | | | | | | | | | |
| 161 | 3 | 953686-0403 | | | | | | | | | | | |
| 162 | 3 | 953688-0403 | | | | | | | | | | | |
| 163 | 3 | 953689-0403 | | | | | | | | | | | |
| 164 | 3 | 953689-1104 | | | | | | | | | | | |
| 165 | 3 | 953695-0000 | | | | | | | | | | | |
| 166 | 3 | 953696-0000 | | | | | 19 | | 19 | 19 | 19 | 19 | 19 |
| 167 | 3 | 953702-0403 | | | | | | | | | | | |
| 168 | 3 | 953817-0403 | | | | | | | | | | | |
| 169 | 3 | 953819-0403 | | | | | | | | | | | |
| 170 | 3 | 961185-0215 | | | | | | | | | | | |
| 171 | 3 | 961206-0403 | | | | | | | | | | | |
| 172 | 3 | 961218-0403 | | | | | | | | | | | |
| 173 | 3 | 961234-0403 | | | | | | | | | | | |
| 174 | 3 | 961247-0403 | | | | | | | | | | | |
| 175 | 3 | 961263-0403 | | | | | | | | | | | |
| 176 | 3 | 961305-0215 | | | | | | | | | | | |
| 177 | 3 | 961305-0403 | | | | | | | | | | | |
| 178 | 3 | 961306-1104 | | | | | | | | | | | |
| 179 | 3 | 961307-0403 | | | | | | | | | | | 7182 |
| 180 | 3 | 961308-0403 | | | | | | | | | | | |
| 181 | 3 | 961322-0403 | | 7267 | 7267 | 12067 | 12067 | 18067 | 18067 | 18067 | 18067 | 18067 | 18796 |
| 182 | 3 | 961322-1104 | | | | | | | | | | | |
| 183 | 3 | 961323-0000 | | | | | | | | | | | |
| 184 | 3 | 961325-1215 | | | | | | | | | | | |
| 185 | 3 | 961336-0403 | | | | | | | | | | | |
| 186 | 3 | 961358-0403 | | 3418 | 3418 | 4858 | 4858 | 4859 | 4859 | 4859 | 4859 | 4859 | 4859 |
| 187 | 3 | 961361-0215 | | | | | | | | | | | |
| 188 | 3 | 961361-0403 | | 5168 | 5168 | 6701 | 6701 | 16301 | 16301 | 16301 | 16301 | 16301 | 21077 |
| 189 | 3 | 961371-0403 | | | | | | | | | | | |

FIG. 6

CONSTRAINT BASED ORDER OPTIMIZATION SYSTEM AND AVAILABLE TO PROMISE SYSTEM

CROSS-REFERENCES TO RELATED APPLICATIONS

Not applicable

Statement as to Rights to Inventions Made Under Federally Sponsored Research or Development Not applicable Reference to a "Sequence Listing," a Table, or a Computer Program Listing Appendix Submitted on a Compact Disk.

Not applicable

BACKGROUND OF THE INVENTION

The present invention relates to computer systems and software for the allocation of inventory to customer orders, and in particular, to such allocation where there is insufficient inventory for the number of customer orders.

There are many products and patents directed to systems for allocating and delivering inventory which assume there is sufficient inventory. For example, a number of systems provide just in time inventory control, such as shown in U.S. Pat. No. 6,882,982. Other patents deal with projecting the need for manufacturing raw materials or components based on projected or actual customer orders. For example, see U.S. Pat. Nos. 6,415,195 or 4,459,663.

Published U.S. Application No. 2004/0210489 shows a system for allocating inventory where there is insufficient supply. This system is directed to measuring each retailer's inventory and rate of sales in order to ensure that each retailer runs out of the product at about the same time. This patent describes the example of a new video release in which demand exceeds the supply.

A number of systems deal with whether a customer's potential order can be met. These are Available to Promise (ATP) systems. An example is found in U.S. Pat. No. 6,167,380. U.S. Pat. No. 6,188,989 appears show ATP software using forecasts.

Demand can often exceed the supply for products for a variety of reasons. A new product may be particularly difficult to manufacture, thus making it difficult to ramp up production. Marketing and order taking may precede the actual availability of the product, creating an excess of demand over supply for this reason. As new features are added to new products, or new products are developed, customer demand may exceed projections, increasing the demand beyond available supply. Typically, these problems are handled by sales administrators allocating available inventory manually on a spreadsheet, which may be updated each day. It would be desirable to automate and improve this process.

Many manufacturers have different priorities for different customers. A large national chain that is a long term customer will usually be higher priority than perhaps a small regional reseller. Companies invest heavily in soft dollar promotions that must be supported at all costs (missing an advertisement with a reseller could be considered extremely damaging). The situation is complicated by order demand received from resellers all having varying order lead times and shipment modes. Additionally, at product launch, demand may greatly exceed supply. Thus managing orders is problematic, especially for companies that launch new and innovative products every year.

Another complicating factor for order management with limited inventory is that different sales channels and customers yield different sales margins. Also, demand can be both fulfilled directly and via distributors. Thus, short Order Cycle Times can be a necessity to compete. Fines and/or penalties are sometimes imposed by resellers when orders are not fulfilled to requirements. This can be complicated by a lengthy supply chain since many products are manufactured in Asia, far away from much of the demand. Effective order management also needs to account for projected future receipts from manufacturers and remote inventory locations. Distribution profitably often requires ocean transit, which is slow.

BRIEF SUMMARY OF THE INVENTION

The present invention provides a system which uses customer-based business rules that are customized for each customer. These business rules, along with order information, are provided to a linear programming engine. The linear programming engine determines the priority of customer orders based on the business rules and allocates scarce inventory accordingly.

In one embodiment, linear programming assigns weights to different factors. Examples of such factors are (1) a promotion activity, (2) a customer priority, (3) the age and Customer Requested Ship Date of an order, and (4) the price of the product.

In one embodiment, forecasts, both short and long range, can be included in addition to orders. This ensures inventory will be available for top priority customers when the orders are formally made. Another advantage is that it enables a sales representative to insert a forecast and tell a customer whether the forecasted order can be filled within the desired time.

In one embodiment, the customized business rules include a reasonable delinquency period for an order. For example, if a higher priority order can be filled with later manufactured inventory with only one day of delay, it may lose priority to a lower priority order that would otherwise be delayed for several weeks. In one embodiment, the system takes into account the availability of multiple components which may be included in one or more products.

In one embodiment, an Available To Promise (ATP) calculation is made without using the linear programming scheduling. An account representative can quickly determine when a desired customer order can be filled. The ATP compares the desired order to other booked and forecast orders, with customer priorities assigned, to determine when an order can be filled.

For a further understanding of the nature and advantages of the invention, reference should be made to the following description taken in conjunction with the accompanying drawings.

BRIEF DESCRIPTION OF THE DRAWINGS

FIG. 5 is a chart of different scenarios for ATP (Available To Promise) calculations according to an embodiment of the invention.

FIG. 6 is a screen shot of an embodiment of an ATP calculation.

DETAILED DESCRIPTION OF THE INVENTION

Overall System

Figures 1, 2A:
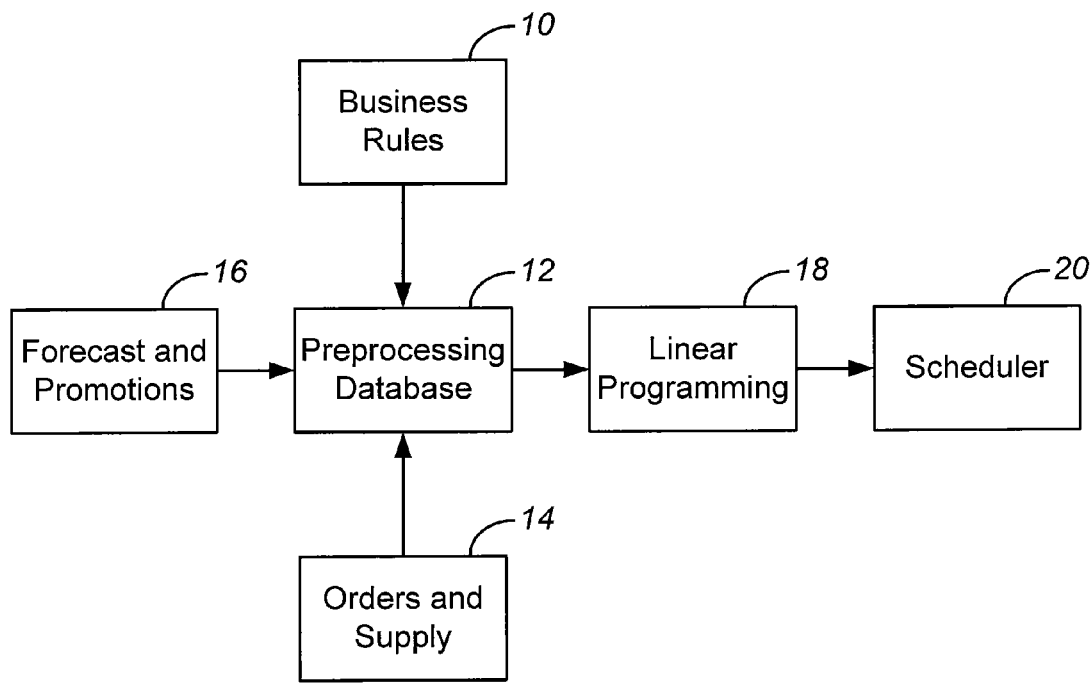
FIG. 1 is a block diagram of a system according to an embodiment of the invention.
FIG. 2A is an example of a weighted delinquency formula according to an embodiment of a linear programming equation based on customer priority.

FIG. 1 shows a simplified view of an embodiment of the invention. A number of manually maintained business rules 10 are fed to a preprocessing database 12. In addition, customer orders and inventory supply files 14 are provided to database 12. Additionally, forecasts and promotions 16 may be provided to preprocessing database 12. The relative priorities of each order are established within the preprocessing database. The preprocessed data is then provided to a linear programming system 18 which does the scheduling so that the delays for all customers, in order of priority and price (Weighted Delinquencies), are minimized. After further processing, the information is provided to a scheduler 20 for allocation of the inventory among the customer orders. The business rules include priorities for different customers as well as customer promotions, the amount of forecasting to be used by each customer, and other customer specific information.

Linear Programming Algorithm and Example

FIG. 2A illustrates an example of a linear programming algorithm used by linear programming module 18 for determining the Weighted Delinquencies of each order or line item. The Weighted Delinquency is based basically on price, time of delay and customer priority. The Scheduling System determines what individual units should be shipped to whom in each scheduling bucket (for example, day or week) for each booked and forecast order (or line item) so as to minimize total Weighted Delinquencies. For a particular order, Weighted Delinquencies =Unit Price*Cumulative # of Units Delinquent*(Customer Priority Weighting+A*(Current Number of Days before or after Customer Due Date)+B* (Age of Order)). A measure of profitability, such as Gross Margin, could be used instead of Unit Price in the equation above.

Figure 2B:
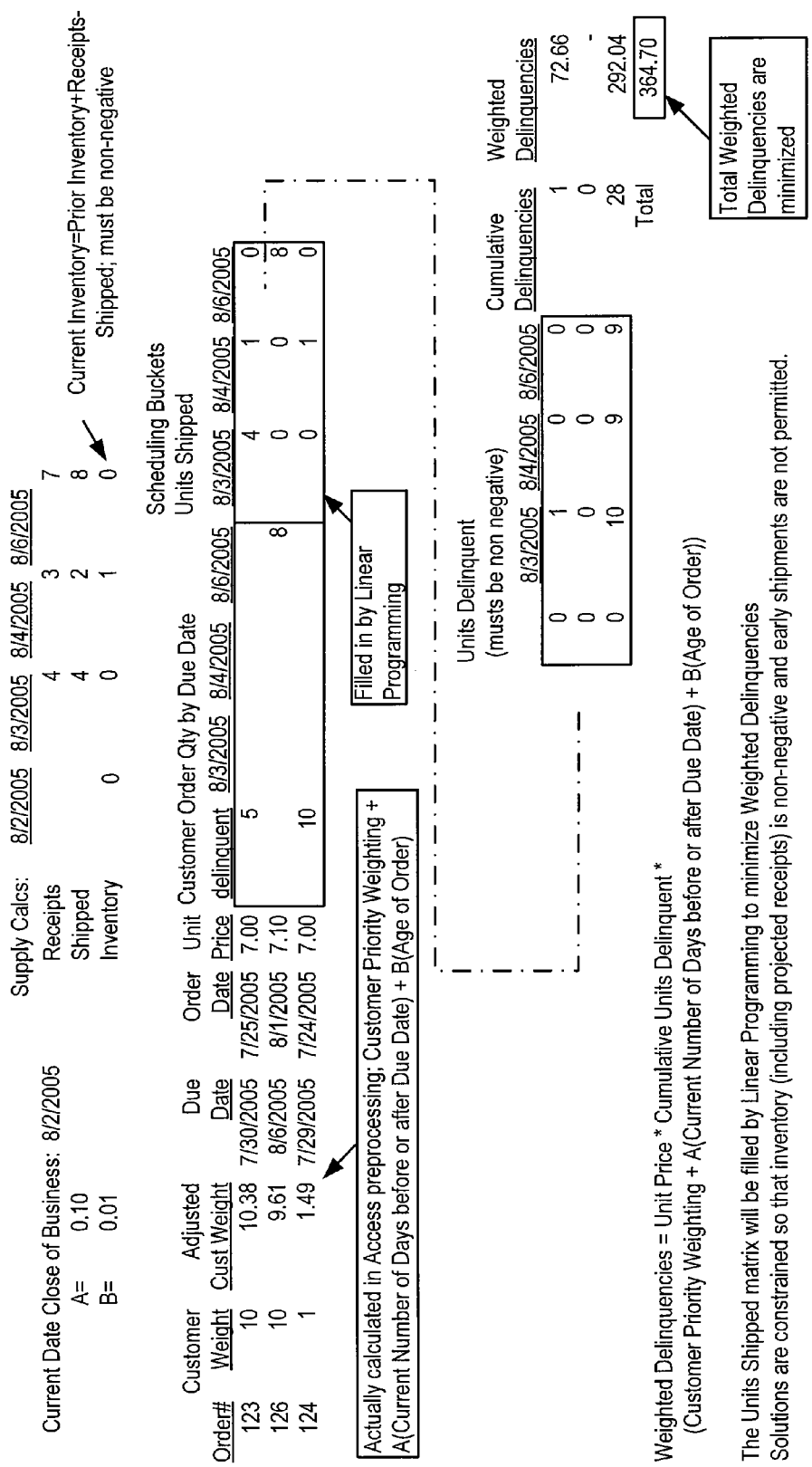
FIG. 2B is a chart of the different parameters and calculation results using the weighted delinquency formula of FIG. 2A.

FIG. 2B shows an example that covers one part (SKU) and three scheduling buckets (work days Aug. 3, 2005, Aug. 4, 2005, and Aug. 6, 2005; Aug. 5, 2005 is not a work day in the example). The Scheduling is being done as of the close of business on Aug. 2, 2005. There are 4 units coming into inventory on 8/3, 3 units on 8/4 and 7 units on 8/6. Parameter A (from the equation above in FIG. 2A) is set to 0.10 and Parameter B is set to 0.01. For Order #123 (5 Units), the Customer Weight is 10. The Adjusted Weight is 10.38=10+ 0.1*3+0.01*8. The 'Current Number of Days before or after Customer Due Date' is 3 days because that is the difference between the Current Date of Aug. 2, 2005 and the Due Date of Jul. 30, 2005 (Note that if the due date was in the future, this number would be negative). The Age of Order is 8 days because that is the number of days between the Current Date and the Order Date of Jul. 25, 2005. There are currently 5 delinquent units. The Linear Programming has determined that 4 units are to be shipped on 8/3 and 1 unit shipped on 8/4. There would thus be 1 unit delinquent on 8/3 and none for future days, resulting in Cumulative Delinquencies=1 (not counting the current delinquencies). Notice that the order has been split into 2 shipments. The Weighted Delinquencies for Order #123 would be 7*1*10.38=72.66, where the Unit Price=$7.00.

The next row is for another order (#126) for the same customer. This order is not due until Aug. 6, 2005. Notice that the Unit Price is $7.10, which is different than the Unit Price for Order #123. This could happen for several reasons. Perhaps pricing changed between the placement of the two orders. The Adjusted Customer Weight is calculated in a similar manner to Order #123. The Linear Programming has determined that all 8 units should be shipped on Aug. 6, 2005. Because this is on time, there are no cumulative delinquencies for this order. Notice that even though this is for a higher Customer Priority than for Order #124, it is not shipped early because early shipments are not permitted in this example.

For Order #124 (10 Units), the Customer Weight=1. The Adjusted Weight is 1.49=1+0.1*4+0.01*9 because there are 4 days between the Current Date of Aug. 2, 2005 and the Due Date of 7/29/2005 and 9 days between the Current Date and the Order Date of 7/24/2005. The Linear Programming has determined that only 1 unit can be shipped (on 8/4/ 2005), even though that leaves a unit in inventory on 8/4. More shipments to fill this order would result in shorting a higher priority order (#126) in the future. For this order, there will be 10 units delinquent on 8/3 and 9 units delinquent on both 8/4 and 8/6, resulting in Cumulative Delinquencies of 28. Thus the Weighted Delinquencies for Order #124 would be 7*2*1.49=292.04. The Total Weighted Delinquencies is 364.70=72.66+0+292.04.

For all orders and all allowable ship days, the linear programming module 18 will determine which individual units should be shipped in each scheduling bucket (for example, day or week) for each booked and forecast order (or line item) so as to minimize Weighted Delinquencies. Shipment of units within an order may be split among several days. The linear programming engine calculates various combinations to minimize the total Weighted Delinquencies, with 364.7 being the minimum in the example shown. This solution is guaranteed to be one of the optimal solutions given the formulas and constraints. No other shipment schedule will result in a lower Total Weighted Delinquencies, although there might be other schedules resulting in the same (but not lower) value for Total Weighted Delinquencies. In one embodiment, the user has the ability to disproportionately weight delinquencies in each scheduling bucket. For example, delinquencies in the near future might be weighted more than delinquencies in the far future.

Solutions are constrained so that inventory (including projected receipts) is non-negative and early shipments are not permitted. The No Early Shipment constraint could be relaxed based on each order's requirements, but there are very few circumstances where that would be beneficial to the supplier.

The customer priority could be determined by any number of factors. For example, a long time customer may have a higher priority, or a repeat customer may have a higher priority than a one-time new customer. Alternately, a particular customer may have a contract or pay a premium for premium service. Alternately, the customers may simply be allocated a priority based on their perceived value to the seller, the intensity of pressure for on-time performance, etc.

The value of the weighting factors and the amount of the customer priority may be varied. Additional factors may be added to the linear programming algorithm, or a different, non-linear algorithm may be used. Exceptions may also be made, or there may be overrides applied to the equation, as set forth in more detail below.

The Linear Programming (LP) optimization technique of the invention is used to create a shipment schedule that minimizes weighted delinquencies (Days late*Units*ASP *Customer Priority Weighting), based on current supplier inventory, scheduled shipments from manufacturers and remote inventory locations, age of the order and customer requested dates. It can account for ad campaigns, product transitions, customer importance, splitting orders, unusual work calendars, and projected orders based on the Market Rate of Demand (MRD) or other forecasts. Scheduling "buckets" can be varied to be one work day (for example) in the immediate future and one week (for example) further into the future. It is also possible to adjust the equation to account for "Firm, Must Fill" line items. For those line items, the Weighting would be multiplied by a very large number. In some embodiments, price is not included in the Weighting equation. When it is, Price may be a Standard Unit Price or the actual Unit Price in the order. If the latter, then an arbitrary small unit price is used for 'no charge' orders. Otherwise, the Weighted Delinquency for a 'no charge' order would always equal zero and might not be filled even if inventory was available.

Figure 3:
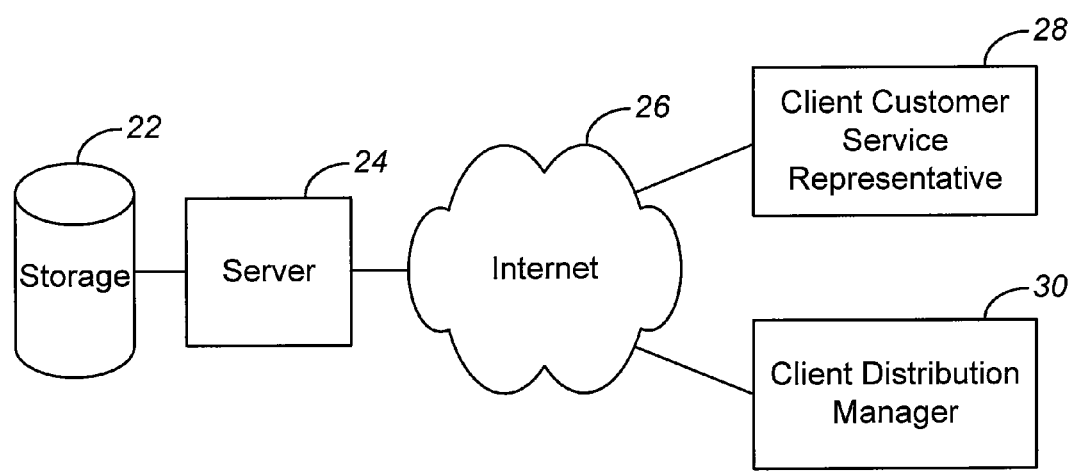
FIG. 3 is a high level hardware diagram of an embodiment of the invention.

FIG. 3 is a high level block diagram of one embodiment of a hardware system incorporating the invention. Storage device 22 will store the databases used by a PC or server 24 to implement the preprocessing and linear programming and scheduling set forth in FIG. 1. Clients may connect to server 24 through a network 26, such as the Internet or an intranet. Files can be transmitted by email or any other means. In one example, a client 28 is a computer operated by a customer service representative who desires to determine if a customer's order can be fulfilled within the time requested. Another client 38 is a computer operated by a distribution manager who monitors the uploading of data and running of the scheduling process, while inserting appropriate overrides. Alternately, the same PC could be used for these functions, with the same or different personnel accessing it.

Figure 4:
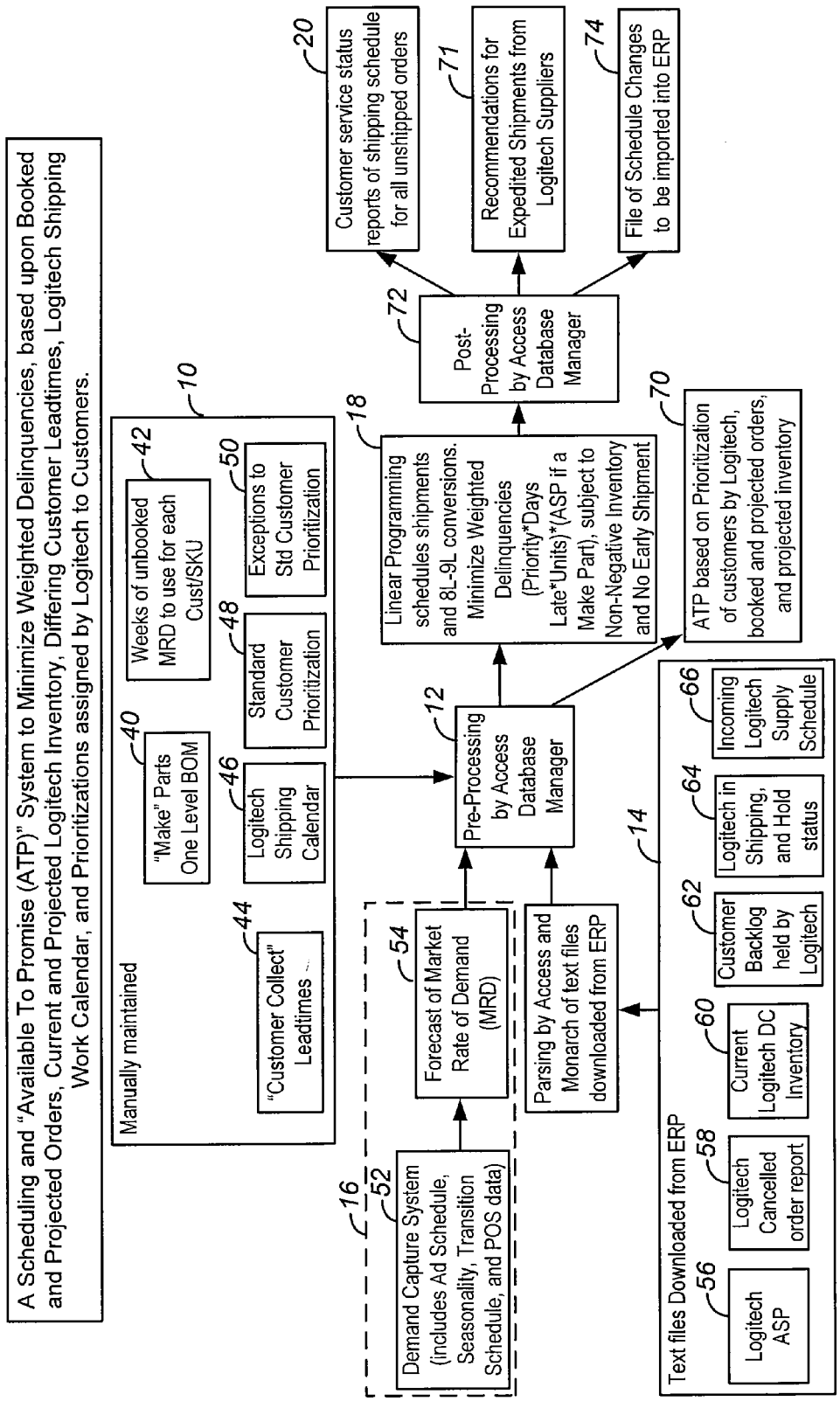
FIG. 4 is a more detailed diagram of the system embodiment illustrated in FIG. 1.

FIG. 4 is a more detailed diagram of the process embodiment set forth in FIG. 1. Business rules 10 in this example include "make" parts, or component parts, at one level of BOM (Bill Of Materials) 40. Another data block 42 is the weeks of unbooked MRD (Market Rated Demand—or forecast) to use for each customer/SKU (Stock Keeping Unit). A data block 44 stores "customer collect" lead times. Customer Collect lead times are a parameter for customers whose orders are consolidated within the shipping process. A data block 46 stores the shipping calendar of the company filling the orders. Data block 48 contains the standard customer prioritization, which is the customer priority weighting used in the linear programming equation. Block 50 is used for storing exceptions to the standard customer prioritization, such as when the customer is running a promotion for a particular SKU. The existence of a promotion can override a customer's normal prioritization, giving an increased prioritization for that promotion.

As also shown in FIG. 1, the business rules are fed to a preprocessing database 12, such as a Microsoft Access™ database manager or similar computer program. Forecast and promotion block 16 includes a demand capture system 52 which includes the ad or promotion schedule of customers, the seasonality effects, a transition schedule, and POS (Point Of Sale) data. The Point of Sale data can be used to indicate actual, current demand by a customer, which can factor into forecasting. The demand capture module 52 feeds information to a forecaster module 54, which then feeds into preprocessing database 12.

Orders and supply module 14 includes text file reports generated by a database such as an Oracle database. The text files are downloaded from an ERP (Enterprise Resource Planning) system. Alternately, preprocessing database 12 could link directly to the data in the ERP or a data warehouse (for example by using ODBC drivers). The information with respect to the supplier or manufacturer can include the supplier's ASP (Average Sales Price) 56, the supplier cancelled customer order report 58 and a current supplier DC (Distribution Center) inventory 60. In addition, file 62 include customer orders or customer backlog held by the supplier, supplier in-shipping and hold status 64 and incoming supply schedule 66. These files are parsed by a parsing unit 68, which then provides the data to preprocessing database 12.

Linear programming module 18 processes the data in order to minimize the weighted delinquencies. This module in one embodiment is implemented with a Microsoft Excel™ using an upgraded version of Frontline Systems' Solver Add-in. This linear programming is also done for 8L-9L conversions, which are the components for a bill of materials. If required because of software capacity constraints, several scheduling modules may be used for Buy SKUs (where the distribution center does not have the ability to assemble the SKUs from other parts in 8L-9L conversions). The schedules are then passed to Post Processing module 72, which consolidates the schedules and creates Customer Service status reports 20 and a file 74 with scheduling changes to booked orders that will be uploaded to the ERP system. In addition, recommendations for expedited shipments to the Distribution Center from its suppliers 71 can be generated.

ATP (Available To Promise)

Also shown in FIG. 4 is a module 70 which provides an ATP (Available To Promise) report for Buy SKUs for use by a customer service representative. This is also based on customer prioritization, booked and projected orders, and projected inventory. The ATP is based on the preprocessing in module 12, before the linear programming of module 18. The ATP for a customer is whatever the desired order amount is, except it can't exceed the calculations of Rule 1 or 2 below (and must be positive per Rule 3). A "must fill" order, such as for a promotion, overrides the above rules, and instead follows Rule 4 below. For those customers that have projected/forecast orders, the ATP will not offer these amounts to others for sale. For situations where available supply cannot support projected/forecast orders, the ATP will give priority to the projected/forecast plans (which are only maintained for strategic customers and SKUs). Once all the projected/forecast orders have been met, the ATP will support all existing backlog. The purpose of the ATP and Scheduling systems are slightly different. A high priority customer may be told, based on the ATP, that there is no supply available. Perhaps that customer is asking for more supply than their Projection/Forecast. If that customer places an order anyway, the Scheduling system will typically ensure that its order is weighted more heavily than those of lower priority customers.

Rule 1: ATP can't exceed (Inventory−Total Booked Backlog for Higher and Equal Priority Customers−Total Projected Backlog for Higher Priority Customers). This is equivalent to: ATP can't exceed (Inventory−Total Customer Backlog for Higher & Equal Priority+Total Projected/Forecast orders this customer's priority). The purpose of this Rule is to preserve the supply for all customers of equal and higher priority, both for Booked and Projected/Forecast orders. If there are no orders (either booked or forecast) this simplifies to saying that ATP can't exceed Inventory.

Rule 2: ATP can't exceed the greater of (Projected/Forecast that Priority), (Projected/Forecast that Priority+Inventory−Total Booked All Customers−Total Projected/Forecast All Customers). This is equivalent to: ATP can't exceed (Projected/Forecast that Priority)+greater of (0, Inventory−Total Booked & Projected/Forecast Orders). The purpose of this Rule is to say that a customer can't be promised more than its Projection/Forecast, unless there is enough supply available to fill the backlog (both Booked and Projected/Forecast) of all other customers, including those of lower priority.

The two Rules above are calculated on Excel sheets "Rule1" and "Rule2".

Rule 3; ATP can't be less than 0.

Rule 4: If request is a Must Fill (Priority=11), then ATP=Inventory−Total Booked for other Must Fill Orders.

The ATP is not dependent on the results of the Linear Programming Schedule. Thus, it can be updated frequently by downloading the needed files. The ATP is calculated for a due date in the future. Total Customer Backlog=Booked Backlog+Projected/Forecast Backlog. The terms Backlog and Orders are used interchangeably. Inventory for a particular day is Current Inventory+Cumulative Scheduled Receipts into the appropriate inventory location(s) up to that particular day. Backlog used in the ATP is the total regardless of day and may include Projected/Forecast Backlog for up to a preset number of weeks (currently 6) depending on the parameters set for a particular Customer/SKU. Implicit in the way these Rules were designed is that most Priority Customers request shipment within a few days.

FIG. 5 is an example of ATP calculations for different amounts of inventory with 3 different customer requests shown. In the example, Customer A is top priority, Customer B is middle priority and Customer C is low priority. The "Backlog" is the same as "booked" in the rules above. In scenario a, since there is only 100 in inventory, and the top priority Customer A has a backlog (booked) of 100, the ATP for all 3 customers is 0. The remaining scenarios show how the inventory is allocated as backlog and projections are filled in customer priority order. The example shows the inventory available on a particular day or scheduling bucket. In actual use, an account representative gets a spreadsheet with a pull down menu with choices for each customer and/or priority level (see FIG. 6). By selecting a particular customer/priority, the ATP for each scheduling bucket will change to the amount appropriate for that customer/priority.

FIG. 6 is a screen shot showing an example of an ATP calculation for a priority 3 customer. A variety of ATPs for different products for different buckets (days) are shown.

Promotions

When a customer runs a particular marketing campaign or other promotion, it is desirable that the customer be able to fulfill those orders. Customers may also have a firm shelf reset date that the manufacturer is expected to meet 100% without delinquency. In one embodiment, the present invention accommodates this by upgrading the customer priority weighting used in the linear programming equation. Alternately, another factor could be added to the equation. Additionally, other transitory events than promotions could be used to modify the prioritization equations. For example, weighting could be changed for a distributor handling a specific unique SKU for a particular retailer.

Forecasts

In addition to orders, the system can accommodate forecasts, both short range and long range. Like an order, the forecast can identify a particular product, the number of units, the requested shipping date, the price and the customer. A forecast for a higher priority customer will have a higher score, and thus higher prioritization in the event of limited inventory. A forecast in the system can also be thought of as a reservation. Higher priority customers may also be allowed to implement longer range forecasts in the system, while lower priority customers need to wait until the forecast is short range or an actual order to be inserted into the prioritization program. In addition, customers whose demand patterns are more volatile, hence more uncertain, may require a short forecast horizon versus customers whose demand is less variable (less uncertain).

Forecasts may come from many sources. A customer may supply a forecast that it has generated itself. Additionally, data may come from actual POS (Point Of Sale) devices, showing the actual number of sales on any given day, week, or other time period. This can be used to generate a forecast, or modify any existing forecast. Additionally, factors such as seasonality, ad campaigns, product transitions, and other events can be factored into the forecast. The allow ability of forecasts can vary not only based on customer, but also on the volatility of particular product sales. Some products may have a reasonably steady amount of sales, while others may be more trendy with high volatility.

Reasonable Delinquency

The prioritization generated by the linear program also takes into account a "reasonable delinquency" factor, which is determined by the relative values of the Customer Priority Weightings that are chosen. A programmed reasonable delinquency delay for the customer with the highest Priority Weighting can be examined to determine if that will allow a customer with a lower Priority Weighting to have a significantly reduced delay in its order fulfillment. For example, suppose that it is January 2, there are 2,000 items of the product on hand, with another 2,000 due to be available from manufacturing on January 16. High priority customer A requires 2,000 units on January 15, while lower priority customer B requires 2,000 units on January 3. The normal programming would allot all 2,000 to customer A of the on-hand inventory, making customer B wait nearly two weeks to fulfill its order to ensure that there is no delay at all for customer A. However, since the delay for customer A is only one day, and supposing the reasonable delinquency is set to two days, the reasonable delinquency factor will flip the orders, with customer B getting the 2,000 on hand, and customer A getting 2,000 available on the 16th, one day late.

The reasonable delay factor is not explicitly entered into a Master Table as a parameter. Rather, the Weightings for each Customer are chosen to produce the desired behavior among Customer Categories and within the Categories. As explained further below, Category A customers will always have first call on supply, no matter how far into the future the Request Date is. Category B customers will always have first call on supply over Category C customers, no matter how far into the future the Request Date is. Within a category, an order receives priority over an order from the next lower priority customer if the due date is 1-2 weeks later than that the lower priority customer. The specific delay factor is a function of when additional supply arrives. For example, suppose that there are 22 scheduling buckets, each of which is a calendar day. Customer X is Priority 4 (with a Priority Weighting of 65) and Customer Y is Priority 5 (with a Priority Weighting of 40). They both have orders for 1 unit of a particular SKU. There is only 1 unit currently in stock, but another unit will arrive in 9 calendar days. Customer X's order is due in 7 calendar days. Customer Y's order is already delinquent. If Customer X gets the in stock units 7 days from now (early shipments are not permitted) and Customer Y gets the next unit 9 days from now, the Total Weighted Delinquencies will be 65*1*0+40*1*9=360. If Customer Y immediately gets the in stock unit and Customer X gets the shipment due in 9 days (2 days delinquent), the Total Weighted Delinquencies will be 65*1*2+40*1*0=130. The Total Weighted Delinquencies in the latter case are less than in the former case, so the Linear Programming will determine that it is better to immediately ship to Customer Y and accept the 2 days of delinquency next week for Customer X. If we change the scenario so that there are no receipts scheduled in the future, the Total Weighted Delinquencies would be 65*1*0+40*1*22=880 and 65*1*(22−7)+40*1*0=910 depending on whether Customer X or Customer Y received the in stock unit. In this case the Linear Programming will determine that it is better to immediately ship to high priority Customer X since there is no other incoming supply identified.

Product Parts or MAKE Parts

The linear programming system of the present invention can also be used to allocate finished products to an assembler, in addition to allocating products to customers. The method applied is similar, with a priority being assigned to different assemblers. In addition, certain parts may not only be allocated to an assembler, but may be sold separately. For example, an assembler may produce a package including a keyboard and a mouse and a software CD with documentation. Those three elements can be considered parts for packaging, and allocated to the assembler in competition with other assemblers. The same keyboard may go in multiple combinations, or may be sold separately, for example. This creates competing needs for the same product part.

In one embodiment, the equivalent of an order for an assembled package is the actual customers orders for the assembled package and customer forecast. These orders are then applied to the upstream parts needed for the assembled package in order to assign priority into which package the parts will go.

Benefits

The invention provides a number of benefits. A company is able to provide visibility to its internal and external customers on the status of their respective sales orders while at the same time optimizing inventory in support of 1) offering high levels of service to those customers whom require it, 2) a constrained inventory, 3) maximum sales margin or revenue, and 4) assuring execution of promotion activity.

Additional Details

In one embodiment, of the text file reports downloaded in database 14, four are in CSV format (All Open Orders, Incoming Open Purchase Orders, Customer Backlog, In Shipping) and two (Inventory and Customer Cancellation) have to be parsed by parser module 68. Only three are actually needed to create the schedule and ATP (Incoming Open Purchase Orders, Customer Backlog, Inventory). The other reports are used as information fields for a view screen, sent to customer service representatives. Text files are checked to reduce the chance of an out of date or corrupted file being used. In some embodiments, CSV text files are parsed by custom programming in Access' Visual Basic to accommodate non-standard variations of the CSV format.

Parser 68 may use Monarch™ by Datawatch Corporation. This parses the inventory and cancellation text files downloaded from Oracle and creates DBF files that Access links to. Batch files are used to automate some of the pre-processing. Forecast and some Master Tables are generated from the separately maintained Demand Capture System. There may also be manually maintained Master Tables such as a) "Customer Collect" Leadtimes, b) Outgoing shipment work calendar (allowing for holidays etc . . . ), c) Normal Customer Prioritizations, d) SKU exceptions to normal Prioritizations, e) Weeks of Unbooked MRD to use for Projected Orders and f) "Make" Parts One Level Bill of Material.

In one embodiment, the process operates as follows:
a) The files are downloaded from an Oracle database at the end of each business day.
b) A batch file is run which tells the Monarch parser to parse and export two of the files. The batch file then opens the Access File.
c) Once the user starts the Pre-Processing in Access, several error checking and input screens appear. Typically, this and the processing takes less than five minutes. Once done, an Excel Menu Form appears
d) The user starts the Excel processing, which can either run ATP alone, or both ATP and LP Scheduling. If the former, less than five minutes are required. If the latter, processing time depends on the number of variables and the speed of the computer. In one embodiment, processing time takes less than an hour. In another embodiment, processing time takes 12 or more hours and is done overnight.
e) Once the schedules have been created, the user returns to the Main Menu and reopens Excel. In Excel, the following outputs are created:
 i. Daily Delinquency Dollars by Customer/SKU,
 ii. A "View" useful for the Customer Service team,
 iii. Daily Shipment Dollars by Customer.
 iv. A text file to be uploaded to the ERP, specifying the schedule changes to be made to booked orders.

In one embodiment, a balance is struck between software capacity and user needs to give a practical solution. For example, 22 scheduling buckets can be used. The first 16 are one workday each. The next 5 buckets are three workdays each. The final (22nd) bucket ends 300 calendar days after the 21st bucket. The same buckets are used for ATP and Scheduling. This limits the number of buckets, while providing daily buckets for immediate demand and still covering nearly a whole year.

Customer Prioritization Details

In one embodiment, Customers are classified by Category and Priority. There are three Categories: A, B, and C. Category A is the highest category with Priorities 10, 9, and 8. Category B has Priorities between 2 and 7. Category C is the lowest category and is essentially every customer that is not in Category A or B. Their Priority Level is 1, the lowest. Category A customers will always have first call on supply, no matter how far into the future the Request Date is. Category B customers will always have first call on supply over Category C customers, no matter how far into the future the Request Date is. Within a Category, a customer will have first call on supply (over the next lower priority customer) up to approximately one week into the future. The Weightings are what is actually used by Linear Programming to calculate Weighted Delinquencies. Their values are chosen to produce the required results.

Demand Capture System details

In one embodiment, the Scheduling System uses copies of several tables maintained by the Demand Capture System. These tables primarily relate to the weekly MRD forecasts from Demand Capture. These forecasts take into account variables such as seasonality, product transitions, and advertisements. Copies of the tables are used instead of direct links, so that the person maintaining the Demand Capture System can ensure that the data is only used once the weekly updates are reviewed for reasonableness.

As will be understood by those of skill in the art, the present invention may be embodied in other specific forms without departing from the essential characteristics thereof. For example, numerous variations could be made in the number of buckets, the weighting factors, the number of priority levels, etc. Accordingly, the foregoing description is intended to be illustrative, but not limiting, of the invention which is set forth in the following claims.

What is claimed is:

1. A computer system configured to allocate products to customers, comprising:
   a memory for storing
      a) customized business rules for each of a plurality of said customers,
      b) the availability of said products;
      c) a plurality of orders from a plurality of said customers; and
   computer readable code embodied on computer readable media for allocating said products to said customers using linear programming to process said plurality of orders and said customized business rules.

2. The system of claim 1 wherein said linear programming assigns weights to factors, said factors including at least one of a promotion activity, a customer priority, an age of an order, a required ship date and a product price.

3. The system of claim 1 further comprising including forecasts with said orders in said linear programming.

4. The system of claim 1 wherein said customized business rules include a reasonable delinquency period for an order, so that a late order with a lower priority overrides a higher priority customer order within said reasonable delinquency period.

5. The system of claim 1 wherein said linear programming assigns a weight to a promotion activity.

6. A computer system configured to determine Available To Promise (ATP) amount of a product on a future due date for a customer, comprising:
   a memory for storing
      a) a priority for each of a plurality of customers;
      b) the estimated available inventory of said product on said due date;
      c) a plurality of orders and forecasts from a plurality of said customers; and
   computer readable code embodied on computer readable media for allocating said inventory of said product to said customers using said priority of each of said customers, thereby providing said ATP amount on said due date.

7. The computer system of claim 6 wherein said allocating is constrained by a first rule that the ATP amount for said customer cannot exceed said estimated available inventory less the total booked backlog for equal and higher priority customers, less the total projected backlog for higher priority customers.

8. The computer system of claim 7 wherein said allocating is further constrained by a second rule that the ATP for said customer cannot exceed said customer's projected backlog unless there is sufficient inventory to fill the booked and projected backlog of all other customers, including those of lower priority.

9. The computer system of claim 8 wherein ATP cannot be less than zero.

10. The computer system of claim 9 wherein a must fill request overrules the above conditions, and the ATP amount is determined to be total estimated inventory less total booked backlog for other must fill orders.

11. A method for allocating products to customers, comprising:
   determining customized business rules for each of a plurality of said customers;
   determining the availability of said products;
   receiving a plurality of orders from a plurality of said customers; and
   allocating said products to said customers using linear programming to process said plurality of orders and said customized business rules.

12. The method of claim 11 wherein said linear programming assigns weights to factors, said factors including at least one of a promotion activity, a customer priority, an age of an order, a required ship date and a product price.

13. The method of claim 11 further comprising including forecasts with said orders in said linear programming.

14. The method of claim 11 wherein said customized business rules include a reasonable delinquency period for an order, so that a later order with a lower priority overrides a higher priority customer order within said reasonable delinquency period.

15. The method of claim 11 wherein said allocation of products includes allocation of parts for assembled products.

16. The method of claim 11 further comprising adding a possible order for a sales representative and in response generating a possible order fulfillment date without affecting the priority calculations visible to other users.

17. The method of claim 11 wherein said linear programming assigns a weights to a promotion activity.

18. A method for allocating products to customers, comprising:
   determining customized business rules for each of a plurality of said customers;
   determining the availability of said products;
   receiving a plurality of orders from a plurality of said customers;
   receiving a plurality of forecasts; and
   allocating said products to said customers using linear programming to process said plurality of orders and forecasts and said customized business rules;
   wherein said linear programming assigns weights to factors, said factors including at least one of a promotion activity, a customer priority, a required ship date, an age of an order, and a product price;
   wherein said customized business rules include a reasonable delinquency period for an order, so that a late order with a lower priority overrides a higher priority customer order within said reasonable delinquency period.

19. The method of claim 18 further comprising transmitting schedule changes to be imported into an Enterprise Resource Planning system.

20. A method for determining Available To Promise (ATP) amount of a product on a future due date for a customer, comprising:
   determining a priority for each of a plurality of customers;
   determining the estimated available inventory of said product on said due date;
   receiving a plurality of orders and forecasts from a plurality of said customers; and
   allocating said inventory of said product to said customers using said priority of each of said customers, thereby providing said ATP amount on said due date.

21. The method of claim 20 wherein said allocating is constrained by a first rule that the ATP amount for said customer cannot exceed said estimated available inventory less the total booked backlog for equal and higher priority customers, less the total projected backlog for higher priority customers.

22. The method of claim 21 wherein said allocating is further constrained by a second rule that the ATP for said customer cannot exceed said customer's projected backlog unless there is sufficient inventory to fill the booked and projected backlog of all other customers, including those of lower priority.

23. The method of claim 22 wherein ATP cannot be less than zero.

24. The method of claim 23 wherein a must fill request overrules the above conditions, and the ATP amount is determined to be total estimated inventory less total booked backlog for other must fill orders.

25. The method of claim 18 wherein said linear programming assigns a weight to a promotion activity.

26. A method for determining Available To Promise (ATP) amount of a product on a future due date for a customer, comprising:
   determining a priority for each of a plurality of customers;
   determining the estimated available inventory of said product on said due date;
   receiving a plurality of orders and forecasts from a plurality of said customers; and
   allocating said inventory of said product to said customers using said priority of each of said customers, thereby providing said ATP amount on said due date;
   wherein said allocating is constrained by a first rule that the ATP amount for said customer cannot exceed said estimated available inventory less the total booked backlog for equal and higher priority customers, less the total projected backlog for higher priority customers;
   wherein said allocating is further constrained by a second rule that the ATP for said customer cannot exceed said customer's projected backlog unless there is sufficient inventory to fill the booked and projected backlog of all other customers, including those of lower priority;
   wherein ATP cannot be less than zero;
   wherein a must fill request overrules the above conditions, and the ATP amount is determined to be total estimated inventory less total booked backlog for other must fill orders.

* * * * *